United States Patent [19]

Wade

[11] 4,050,987
[45] Sept. 27, 1977

[54] ROTATING PLUG BEARING AND SEAL

[75] Inventor: Elman E. Wade, Ruffs Dale, Pa.

[73] Assignee: Westinghouse Electric Corporation, Pittsburgh, Pa.

[21] Appl. No.: 537,474

[22] Filed: Dec. 30, 1974

[51] Int. Cl.² .......................................... G21C 13/06
[52] U.S. Cl. ....................... 176/87; 277/71; 308/36.1
[58] Field of Search .............. 176/87; 220/3, 9 A, 220/319, 320, 378; 277/71, 72, 74, 78, 79; 308/36.1

[56] References Cited

U.S. PATENT DOCUMENTS

| 1,689,912 | 10/1928 | Carrey | 277/74 X |
|---|---|---|---|
| 3,042,417 | 7/1962 | Derman et al. | 277/78 X |
| 3,698,724 | 10/1972 | Blachere et al. | 176/87 X |
| 3,819,478 | 6/1974 | Thorel et al. | 176/87 |
| 3,819,479 | 6/1974 | Jacquelin | 176/87 |
| 3,837,659 | 9/1974 | Moncrief | 277/74 |
| 3,841,964 | 10/1974 | Dumayne | 176/87 X |
| 3,867,254 | 2/1975 | Brandsetter | 176/87 |

Primary Examiner—Samuel W. Engle
Assistant Examiner—Peter A. Nelson
Attorney, Agent, or Firm—D. C. Abeles; Z. L. Dermer

[57] ABSTRACT

A bearing and seal structure for nuclear reactors utilizing rotating plugs above the nuclear reactor vessel. The structure permits lubrication of bearings and seals of the rotating plugs without risk of the lubricant draining into the reactor vessel below. The structure permits lubrication by utilizing a rotating outer race bearing.

19 Claims, 3 Drawing Figures

ROTATING PLUG BEARING AND SEAL

BACKGROUND OF THE INVENTION

This invention relates generally to nuclear reactors and more particularly to a bearing and sealing system for nuclear reactors utilizing rotating members above the nuclear reactor vessel.

The nuclear reactor produces heat by fissioning of nuclear materials fabricated into fuel elements and assembled within a nuclear core situated in a pressure vessel. In commercial nuclear reactors, the heat produced thereby is used to generate electricity. Such nuclear reactors typically comprise one or more primary flow and heat transfer systems, and a corresponding number of secondary flow and heat transfer systems. These secondary heat transfer systems are coupled to conventional steam turbines and electrical generators. A typical energy conversion process for a commercial nuclear reactor, therefore, involves transfer of heat from a nuclear core to the primary coolant flow system, to a secondary coolant flow system, and finally into steam from which electricity is generated.

At the top of the pressure vessel, it is customary to provide a head to seal the nuclear reactor. A plurality of penetrations pass through this head into the reactor vessel below. These penetrations, typical of which are control rod assemblies and transfer machines, perform functions within the nuclear pressure vessel.

To assure complete access to all areas of the pressure vessel, particularly for liquid metal cooled, breeder reactors these penetrations are generally mounted on rotatable members such as rotating plugs. These rotating plugs are generally cylindrical, and are of decreasing size, the innermost plug being the smallest and the outermost plug being the largest. For the most efficient operation, each plug is radially offset from each other plug, and each plug is supported by the next largest plug.

During operation, each plug is rotated independently of other plugs. Additionally, each plug supports penetrations which may rotate independently of the plug.

It is customary for each rotating plug member to be connected to its supporting member by means of a load bearing. This type of connection permits rotation while maintaining support. To permit this rotation, the rotating members cannot otherwise be physically joined together. Because this connection occurs above the nuclear reactor vessel, sealing means must be utilized to prevent the escape of any gases present in the pressure vessel through the annulus between the two members. Such gases may comprise reactor vessel cover gases which are positioned above the liquid metal level in the pressure vessel of a liquid metal cooled reactor and/or may include fission gases released from the nuclear level during reactor operation. These sealing means are seals attached to one of the members, and kept in sliding contact with the other member.

A problem arises in the course of nuclear reactor operations. the seals and the bearings are in friction contact with the members during rotation. These friction forces will eventually cause both the seals and the bearings to lose their expected effectiveness.

Because the location of the seals and bearings are above the reactor vessel, they cannot be easily lubricated to minimize friction loses. Any excess lubrication present would drain down the annulus between the two members and into the reactor cavity. There, this lubrication may cause undesirable reactions with the reactor components.

Another problem occurs when changing the bearings or the seals. To prevent an undesirable leakage of radioactive gases into the atmosphere, the pressure vessel is desirably kept in an airtight enclosure. The usual means of accomplishing this during reactor operation is by means of the seals. However, some other mechanism must be utilized when the seals themselves have to be changed. Prior practice in the field was to place an airtight enclosure over the entire head area. Then, the seals and the bearings were changed by machinery controlled external to the enclosed head. This method requires the use of complex machinery and control mechanisms, and results in a long stoppage of operation of the nuclear reactor.

Another method utilized is to pour a liquid metal into a trough provided for it in the annulus, and allow it to freeze, sealing the annulus. This method is not entirely satisfactory, as the metal could overflow from its trough and drain into the reactor pressure vessel.

SUMMARY OF THE INVENTION

Briefly stated, the above disadvantages of the prior art are eliminated by this invention by providing a means for lubricating the seals and the bearings without the risk of lubricant flowing into the pressure vessel. The load structure for the supported member is constructed in a generally U-shaped configuration, and this structure accepts a bearing structure from the supporting member. The load bearing and seals are placed on the external side of the supporting member's bearing structure. In this location, any excess lubricant would be draining to the top of the supporting member, and not into the reactor vessel.

BRIEF DESCRIPTION OF THE DRAWINGS

For a better understanding of the invention, reference may be had to the preferred embodiment, taken in connection with the accompanying drawings, in which.

DESCRIPTION OF THE PREFERRED EMBODIMENT

Figure 1:
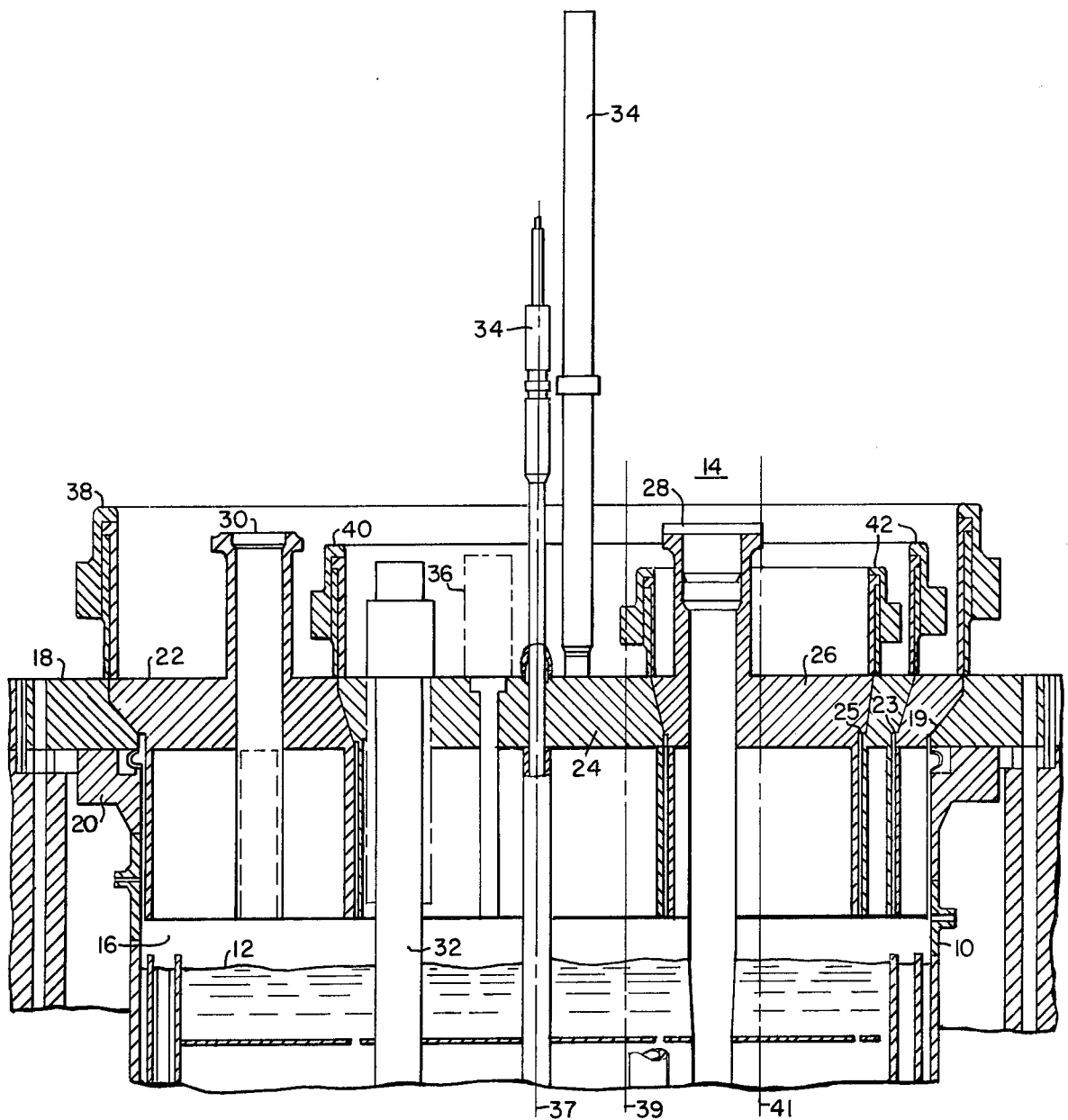
FIG. 1 is a longitudinal section of the upper portion of a nuclear reactor.

Throughout the description which follows, like reference characters indicate like elements of various figures of the drawings.

FIG. 1 of the drawing illustrates a typical nuclear reactor system which can employ the principles of this invention. An elongated nuclear reactor pressure vessel 10 contains a quantity of reactor coolant such as liquid sodium graphically illustrated and designated as the Numeral 12. The top of the pressure vessel 10 is sealed by a nuclear reactor pressure vessel closure head 14. In the space formed by the pressure vessel 10 and the closure head 14 and above the level of liquid coolant 12 is installed an inert gas known generally as cover gas 16. The head 14 has a stationary outer ring 18 which is bolted to a flange 20 of the pressure vessel 10. The head 14 has a plurality of generally planar, cylindrical rotating members such as plugs 22, 24 and 26. The plug 22, of the largest diameter, is coaxial with the vessel 10. The stationary member, ring 18, has an opening 19 in which the large plug 22 is positioned. The large plug 22 has an opening 23, excentric to the large plug axis 37 in which the intermediate plug 24 is positioned. The intermediate plug 24 has an opening 25, excentric to the intermediate plug axis 39 in which the small plug 26 is positioned. These rotating plugs 22, 24, 26 position the fuel and control handling equipment over all desired vessel locations.

The plug 26 supports an in-vessel transfer machine plug 28 excentrically. The plug 22 supports the ex-vessel transfer machine plug 30 excentrically. The plug 24 supports columns 32 which support the upper internals (not shown), the control rod assembly mechanisms 34, and one or more sealed surveillance ports 36. By rotating the plugs 22, 24, 26, the in-vessel transfer machine plug 28 can be positioned over the various components in the vessel, and over the ex-vessel transfer machine plug 30. The small plug 26 is connected to and supported by plug 24 through the load structure 42. The intermediate plug 24 is connected to and supported by plug 22 through the load structure 40. The large plug 22 is connected to and supported by the stationary outer ring 18 through the load structure 38.

Figure 2:
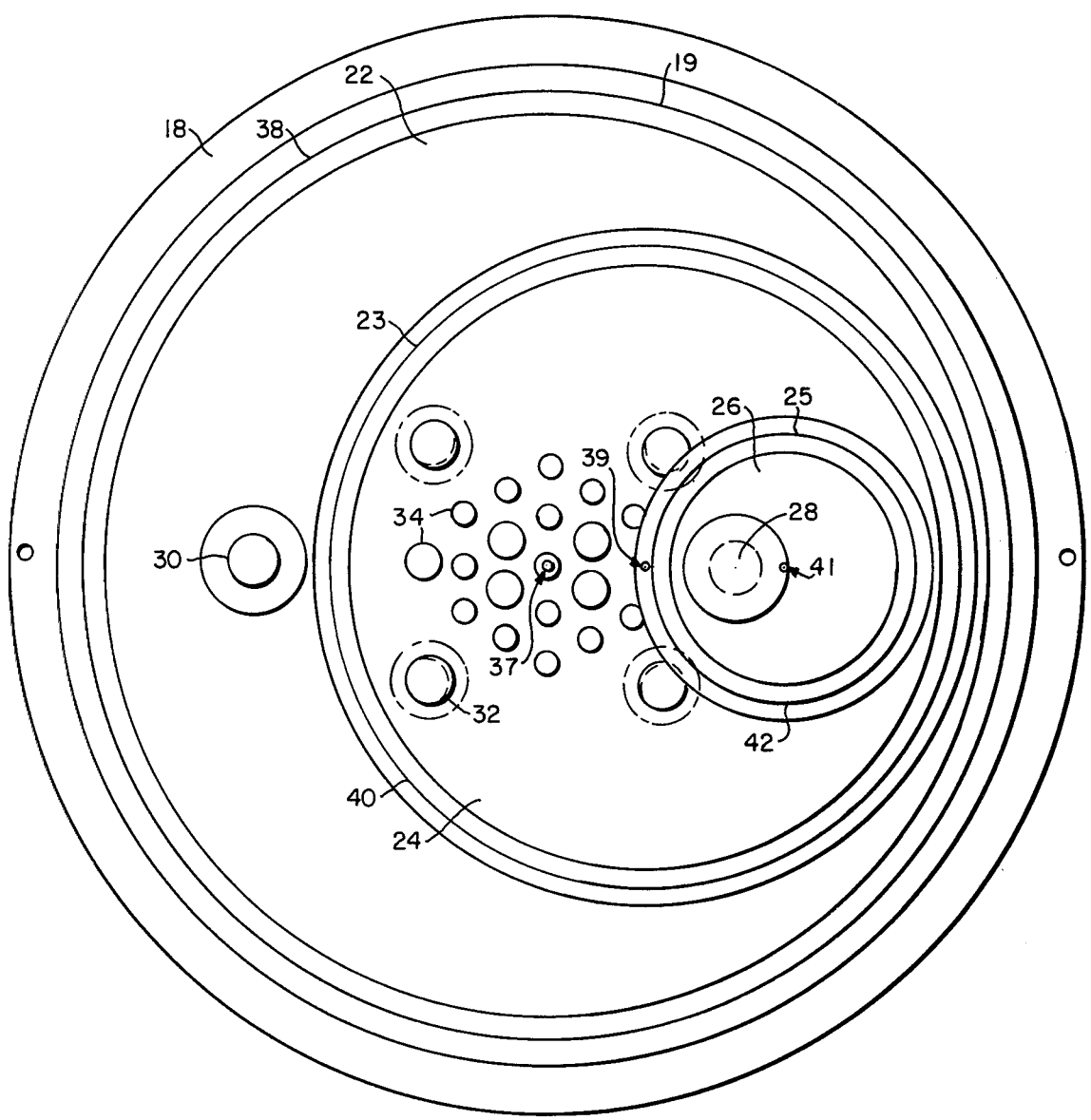
FIG. 2 is a plan view of the top of the reactor shown in FIG. 1.

FIG. 2, a top view of the closure head 14, illustrates the rotation of these plugs 22, 24 and 26. The smallest diameter plug 26 can rotate about its axis 41. The intermediate plug 24 can rotate around its axis 39 and the small plug 26 remains in its position on plug 24. The large plug 22 can rotate around its axis 37 while both plugs 24 and 26 remain in their position on plug 22. In this manner, the small plug 26 and its in-vessel transfer machine plug 28 can be positioned over any desired vessel locations.

Figure 3:
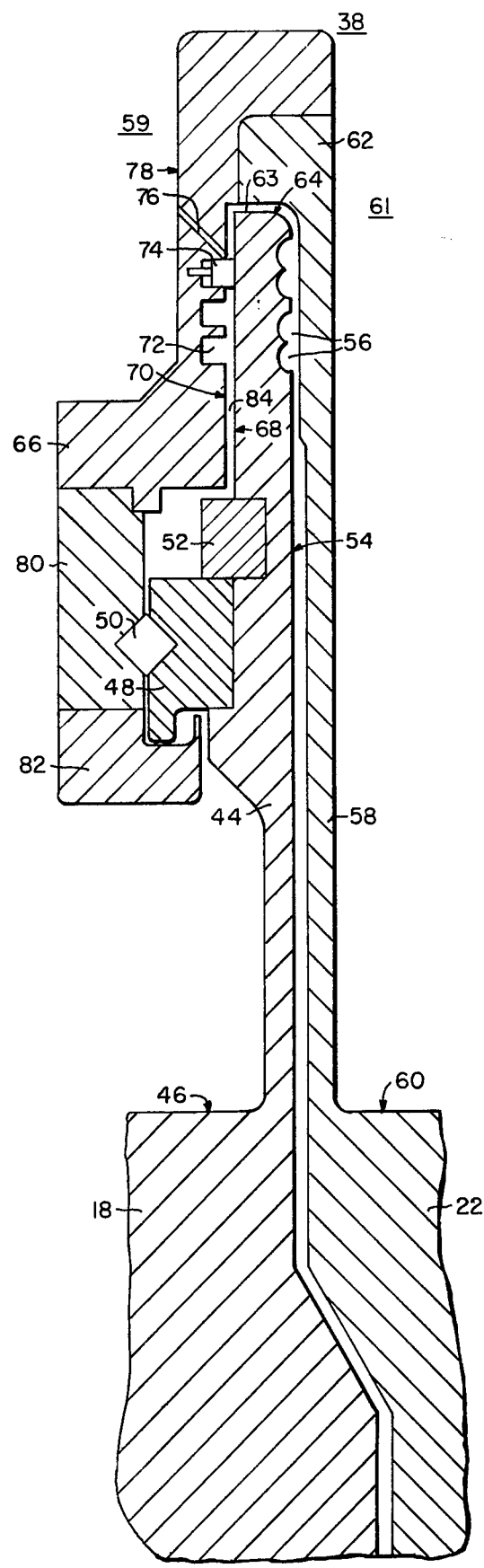
FIG. 3 is a detailed view of the load structure between the large rotating plug and the stationary ring.

Reference is now made to FIG. 3, which shows a detailed view of the load structure 38 between the stationary outer ring 18 and the largest diameter plug 22. This load structure 38 is illustrated for descriptive purposes, and it would be obvious to one skilled in the art that a similar structure may be employed as load structures 40 and 42. Likewise, the asimilar structure may be used in conjunction with any rotating member which penetrates the closure head 14.

The stationary ring 18 has an annular supporting structure 44 rising vertically above the top edge 46 of the stationary ring 18. The supporting structure 44 is connected to the inner race 48 of the bearing 50. The inner race 48 and its associated bearing 50 are secured to the supporting structure 44 by means of a ring 52. The inner side 54 of the annular supporting structure 44, contains cavities 56 into which maintenance seals (not shown) can be inserted during maintenance operations.

The large plug 22 has an annular support riser 58 rising vertically above the top edge 60 of the large ring 22. The support riser 58 has an extension 59 comprised of an upper flange 62 which fits over the top side 64 of the supporting member 44 of the stationary ring 18, and an annular sealing structure 66 which is hermetically secured to the flange 62 of the support riser 58 and extends vertically downward from the upper flange 62 adjacent to the outer side 68 of the supporting structure 44. The support riser 58 and the extension 59 form a generally U-shaped first annular space 63 in which the support structure 44 is positioned. The outer side 68 of the supporting structure 44 and the edge 70 of the sealing structure 66 (part of the extension 59) form a second annular space 84.

Three elements, the support riser 58, the upper flange 62, and the sealing structure 66 form the support structure 61 of the large plug 22. While support structure 61 can be manufactured as one piece, for ease of installation and maintenance the preferred method is to use the three separate elements 58, 62, and 66. Throughout the following description, it will be assumed that the support structure 61 is comprised of the three elements 58, 62 and 66, although the invention is equally applicable to a one-piece structure.

The edge 70 of the sealing structure 66 has cavities 72 above the elevation of the bearing 50 into which sealing means such as inflatable annular seals 74 are placed. Lubricating means 76 are connected on one side to the inflatable seals 74, and are accessible to the exterior 78 of the sealing structure 66.

The sealing structure 66 is secured to, and supported by, the outer race 80 of the bearing 50. A lubricant collector 82 is located beneath the bearing 50, the inner race 48 and the outer race 80. This lubricant collector 82 is shown in the drawing as being connected to outer race 80, although alternate locations would have it connected to the inner race 48 or the support structure 44.

During rotation of the plug 22, the support structure 61, shown as support riser 58 flange 62, and sealing structure 66, the outer race 80, the seals 74 and the lubricant collector 82, if so connected, rotate around the large plug axis 37. The stationary ring 18 with its supporting structure 44, the inner race 48, and the ring 52 remain stationary. The plug 22 is supported above the reactor vessel 10 during this rotation by the stationary ring 18 through the bearing 50. During lubrication, lubricant is inserted through the lubricating means 76 to the seals 74. The lubricant then flows down the annulur space 84 between the external edge 68 of the supporting structure 44 and the edge 70 of the sealing structure 66 to the bearing 50. Any excess lubrication is then caught in the lubricant collector 82. If the lubricant collector 82 becomes full, the lubricant could be removed by means of a drain hole (not shown). Although not shown on the drawing, if means for lubricating the bearing 50 directly are desired, such means can be inserted through the outer race 80. Any excess lubricant from this lubrication would also be caught in the lubricant collector 82.

During maintenance operations, maintenance seals (not shown) are inserted into the cavities 56 provided for them in the supporting structure 44 of the stationary ring 18. These seals prevent the escape of any gases from the reactor cavity 16. Then the sealing structure 66 and the bearing 50 are removed from their positions. The seals 74 and the bearing 50 can then be replaced.

Thus, it can be seen that this invention teaches a system by which seals and bearings for rotating members above the reactor vessel of nuclear reactors can be lubricated without risk of having lubricant drain into the reactor vessel.

I claim as my invention:

1. A nuclear reactor including an elongated pressure vessel, a pressure vessel closure head secured to said pressure vessel, said pressure vessel closure head having rotatable members above said pressure vessel, and a structure for supporting said members which permits lubrication of seals and bearings, said structure for supporting said members comprising:
   a generally planar, rotatable, cylindrical first plug;
   a generally planar cylindrical first member having an opening therein, said first member receiving said first plug in said opening;

an annular first support structure secured to the periphery of and extending vertically above said first plug, said first support structure having an extension horizontally outward from the outer side of said first support structure and extending vertically downward, said extension and said first support structure forming a generally U-shaped first annular space;

an annular second support structure having an inner side and an outer side secured to said first member, said first annular space receiving said second support structure therein, said extension of said first support structure and said outer side of said second support structure forming a second annular space;

a bearing having an inner race and an outer race, said outer race being secured to said extension of said first support structure and said inner race being secured to said outer side of said second support structure;

means for sealing said second annular space;
means for lubricating said bearing; and
means for lubricating said means for sealing said second annular space.

2. The reactor according to claim 1 wherein said means for sealing said second annular space are located at a first elevation; and
said bearing is located at a second elevation vertically lower than said first elevation.

3. The reactor according to claim 2 wherein said means for lubricating said means for sealing said second annular space include means for supplying a lubricant to said means for sealing said second annular space; and,
said means for lubricating said bearing include means for supplying said lubricant from said means for sealing said second annular space, through said second annular space, and to said bearing.

4. The reactor according to claim 1 wherein means for collecting excess lubricant from said means for lubricating said bearing are located beneath said bearing.

5. The reactor according to claim 1 wherein said means for sealing said second annular space include inflatable seals.

6. The reactor according to claim 1 wherein said first support structure comprises;
an annular support riser having an upper flange, said upper flange extending horizontally outward from the outer side of said support riser, said support riser being secured to and extending vertically above said first plug; and
an annular sealing structure hermetically secured to said upper flange of said support riser, said sealing structure extending vertically below said upper flange, said sealing structure, said upper flange, and said support riser forming said generally U-shaped first annular space, said sealing structure being secured to said outer race of said bearing, said second support structure being positioned in said first annular space, said outer side of said second support structure and said sealing structure forming said second annular space.

7. The reactor according to claim 1 wherein said inner side of said second support structure has a cavity therein, said cavity being adapted to have a maintenance seal inserted therein during reactor maintenance operations.

8. The reactor according to claim 1 wherein said means for lubricating said bearing are located in said outer race of said bearing.

9. The reactor according to claim 1 wherein
said pressure vessel closure head has a stationary outer ring; and
said stationary outer ring is secured to said pressure vessel.

10. The reactor according to claim 9 wherein said first member is said stationary outer ring.

11. The reactor according to claim 9 wherein said first member is a rotatable large diameter plug; and
said first plug is an intermediate diameter plug having a diameter smaller than said opening in said large diameter plug.

12. The reactor according to claim 11 wherein said opening in said large diameter plug is excentric to an axis of said large diameter plug.

13. The reactor according to claim 11 wherein said stationary outer ring has a diameter larger than said large diameter plug;
said stationary outer ring has an opening therein;
said large diameter plug being positioned in said opening of said stationary outer ring,
said large diameter plug being rotatably secured to said stationary outer ring.

14. The reactor according to claim 13 wherein said pressure vessel has an upper support flange; and
means securing said stationary outer ring to said upper support flange of said pressure vessel.

15. the reactor according to claim 9 wherein said first member is a rotatable intermediate diameter plug; and
said first plug is a rotatable small diameter plug having a diameter smaller than said opening in said intermediate diameter plug.

16. The reactor according to claim 15 wherein said opening in said intermediate diameter plug is excentric to an axis of said intermediate diameter plug.

17. The reactor according to claim 15 wherein;
a rotatable large diameter plug, having a diameter larger than said intermediate diameter plug, has an opening therein;
said intermediate diameter plug being positioned in said opening of said large diameter plug,
said intermediate diameter plug being rotatably secured to said large diameter plug.

18. The reactor according to claim 17 wherein said stationary outer ring has a diameter larger than said diameter of said large diameter plug;
said stationary outer ring having an opening therein;
said large diameter plug being positioned in said opening of said stationary outer ring,
said large diameter plug being rotatably secured to said stationary outer ring.

19. The reactor according to claim 18 wherein said pressure vessel has an upper support flange; and
means securing said stationary outer ring to said upper support flange of said pressure vessel.

* * * * *